United States Patent [19]

Petzl

[11] Patent Number: 5,521,022
[45] Date of Patent: May 28, 1996

[54] CASE FOR ELECTRICAL BATTERIES OR ACCUMULATOR CELLS

[75] Inventor: Paul Petzl, Barraux, France

[73] Assignee: Zedel, Crolles, France

[21] Appl. No.: 276,657

[22] Filed: Jul. 19, 1994

[30] Foreign Application Priority Data

Aug. 3, 1993 [FR] France ............................ 93 09652

[51] Int. Cl.[6] .................................................. H01M 2/04
[52] U.S. Cl. .............................. 429/97; 429/99; 429/100
[58] Field of Search .............................. 429/96, 97, 98, 429/99, 100, 175

[56] References Cited

U.S. PATENT DOCUMENTS

| | | | |
|---|---|---|---|
| 1,135,580 | 4/1915 | Harris | 429/99 |
| 2,308,270 | 1/1943 | Cubert . | |
| 3,846,178 | 11/1974 | Evjen | 429/96 X |
| 4,593,461 | 6/1986 | Thiele et al. | 429/99 X |
| 4,724,189 | 2/1988 | Chase | 429/99 |
| 4,806,440 | 2/1989 | Hahs, Jr. et al. | 429/99 X |
| 5,004,129 | 4/1991 | Loch et al. | 429/97 X |
| 5,104,754 | 4/1992 | Dorinski et al. | 429/99 |
| 5,197,889 | 3/1993 | Rizzo et al. | 429/99 X |

OTHER PUBLICATIONS

Patent Abstracts of Japan, vol. 9, No. 173 (E–329) (1896) 18 Juillet 1985 & JP-A-60 044 957 (Matsushita Denki Sangyo K.K.) 11 Mars 1985 *Abrege*.
Patent Abstracts of Japan, vol. 15, No. 36 (E–102) 29 Janvier 1991 & JP-A-02 274,128 (Fujitsu Ltd.) 8 Novembre 1990 *Abrege*.
Patent Abstracts of Japan vol. 9, No. 65 (E–304) (1788) 26 Mars 1985 & JP-A-59 203 364 (Sanyo Denki K.K.) 17 Novembre 1984 *Abrege*.

*Primary Examiner*—Stephen Kalafut
*Attorney, Agent, or Firm*—Watson Cole Stevens Davis

[57] ABSTRACT

A case for electrical batteries comprises a support part securely united to the cover to form an extractable module housed in a casing sealed off by a cover. Clamping grips are articulated symmetrically on the opposite side faces of the casing to cooperate with retaining recesses of the cover so as to generate both a uniform distribution of the contact pressure on all the batteries, and a tightness at the level of the asembly interface of the cover and the upper edge of the casing. The case is used for a power supply unit of a portable lighting lamp.

8 Claims, 7 Drawing Sheets

CASE FOR ELECTRICAL BATTERIES OR ACCUMULATOR CELLS

BACKGROUND OF THE INVENTION

The invention relates to a case for housing electrical elements of a voltage supply source, notably batteries or accumulator cells, i.e., voltaic cells, and comprising a hollow casing containing a means for supporting the electrical elements, a cover sealing the casing, and an electrical interconnection circuit with a cable passing through an orifice of the casing for supply of an external receiver.

In known cases of the kind mentioned, it is conventional, after the batteries have been fitted, to proceed with electrical connection of the batteries with the cable, before sealing the case by fitting the cover.

It is also state of the art to fit batteries in housings of a fixed casing, and to then seal the case following insertion by sliding of a closing cover in the grooves of the casing.

The object of the invention consists in improving the installation or replacement operations of batteries in an electrical power supply case.

SUMMARY OF THE INVENTION

The case according to the invention is characterized in that:

a means for supporting the electrical elements is secured to the cover to form a module in the form of an extractable cartridge, a first contact circuit connects the electrical elements to one another in the vicinity of the cover, a second contact circuit is arranged facing the first circuit at the bottom of the casing, and means for securing the cover on the casing comprise a pair of grips, articulated symmetrically on the opposite side faces of the casing, each grip comprising a latching surface designed to cooperate with a retaining part located at each end of the cover so as to generate both a uniform contact pressure distribution over all the electrical elements, notably the batteries, and a tightness at the level of the assembly interface of the cover and top edge of the casing.

According to a first embodiment using a case for batteries, the removable support means is formed by a sliding rack having adjacent compartments for positioning and securing the batteries.

According to a second embodiment using a case for accumulator cells, the accumulator cells are mechanically secured to one another to form a monoblock assembly fixed directly to the cover, electrical connection of the cells being achieved by welding of connecting strips.

BRIEF DESCRIPTION OF THE DRAWINGS

Other advantages and features will become more clearly apparent from the following description of an illustrative embodiment of the invention, given as a nonrestrictive example only and represented in the accompanying drawings in which.

DESCRIPTION OF THE PREFERRED EMBODIMENT

Figure 1:
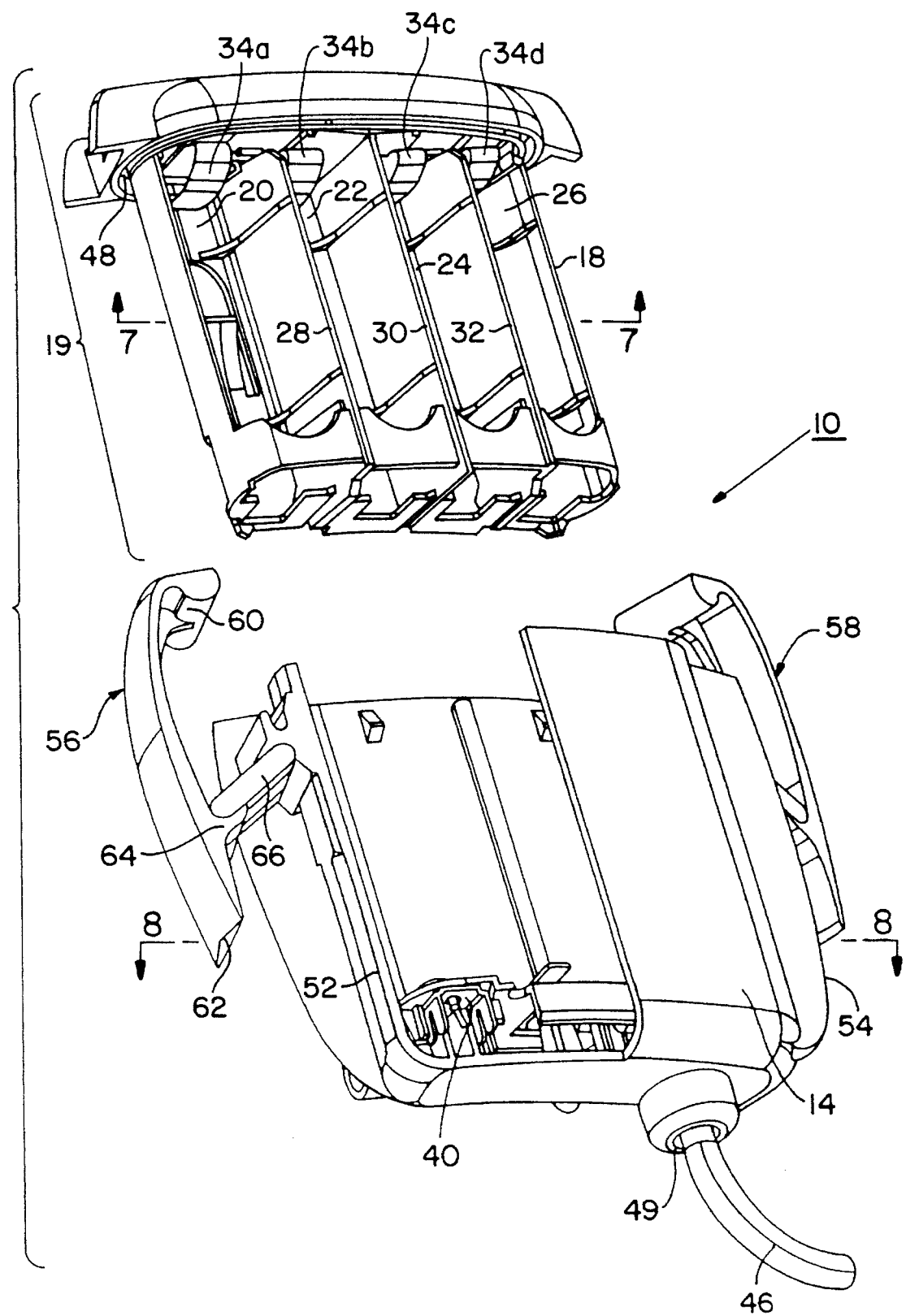
FIG. 1 is a perspective view of the case according to the invention, after the battery support module has been completely removed, the wall of the casing being partly torn away to show the inside.

In the figures, a case 10 for housing electrical batteries 12 is made up of two parts which can be fitted together comprising a hollow casing 14 sealed off by an assembly formed by a cover 16 and battery support 18.

The battery support part or means 18 is made of moulded insulating material and comprises different juxtaposed compartments 20, 22, 24, 26 separated from one another by flat intermediate partitions 28, 30, 32. In each compartment 20, 22, 24, 26 of the support 18 a battery 12 of elongated form and circular cross-section can be inserted. The support 18 is in the form of a cartridge secured by clipping to the cover 16 so as to form an extractable module 19 able to be inserted in or removed from the internal volume of the casing 14.

Figure 6:
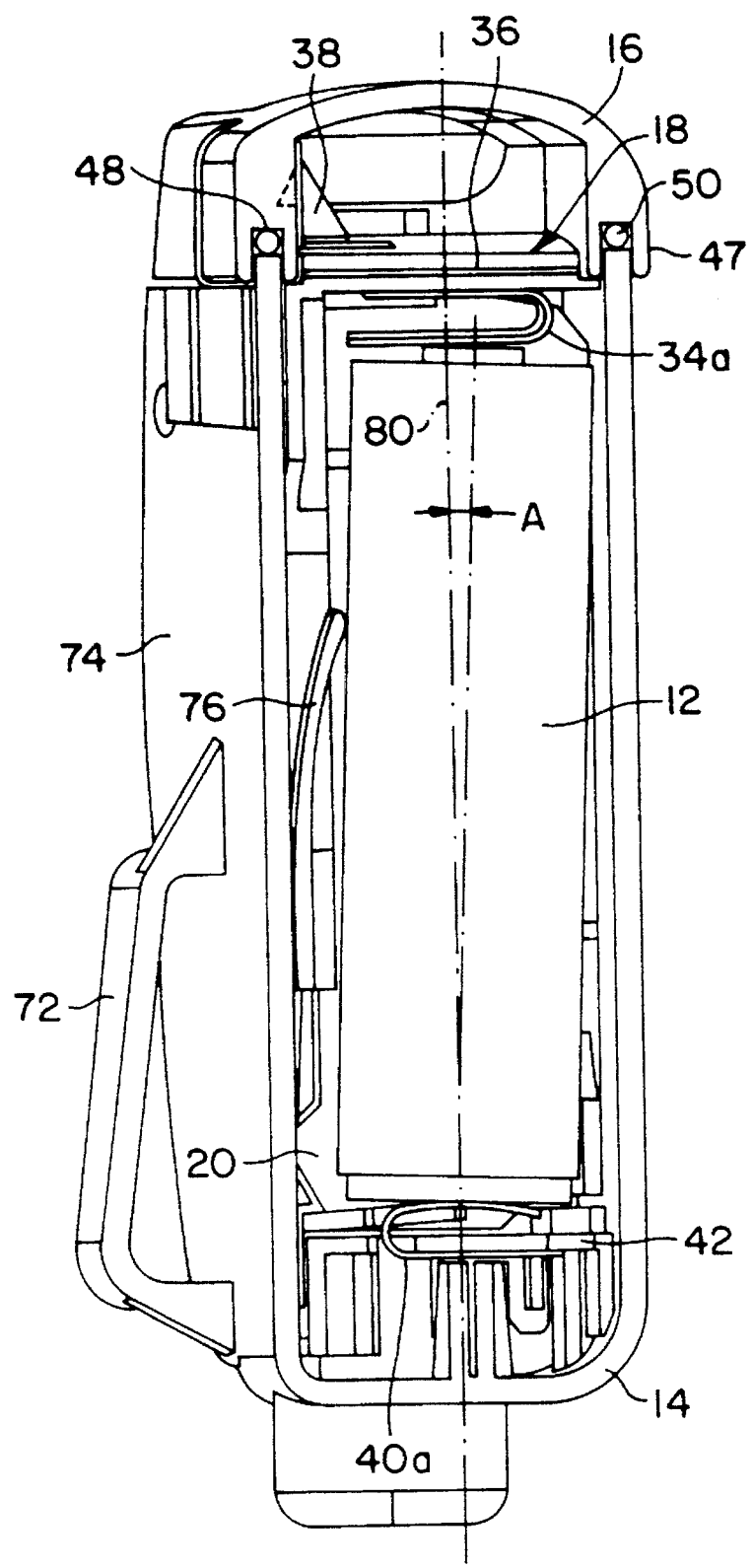
FIG. 6 is a longitudinal cross-sectional view along the line 6—6 of FIG. 5.
Figure 7:
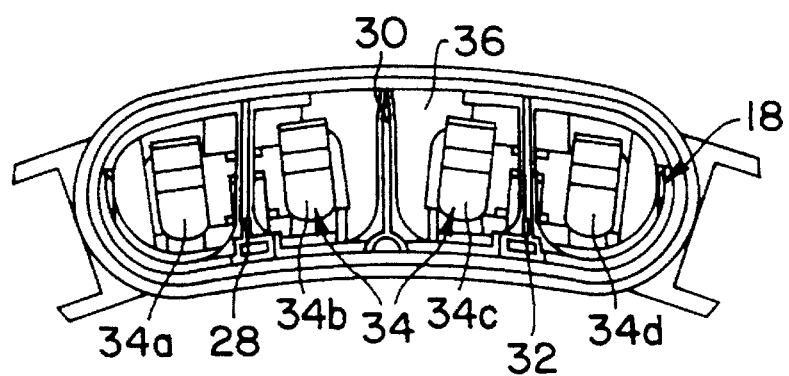
FIG. 7 is a transverse cross-sectional view of the module along the line 7—7 of FIG. 1.

A first interconnection contact circuit 34 is supported by the internal surface of the upper wall 36 of the support 18, and comprises two pairs of contact strips 34a, 34b, 34c, 34d (see FIG. 7). The external surface of the wall 36 is equipped with clipping lugs 38 (one of which is visible in FIG. 6) designed to be clipped into conjugate orifices of the cover 16. Opposite from the first contact circuit 34, each compartment 20, 22, 24, 26 has an open bottom enabling the corresponding poles of the batteries 12 to come into contact with a second interconnection contact circuit 40 fixed in the bottom of the casing 14.

Figure 8:
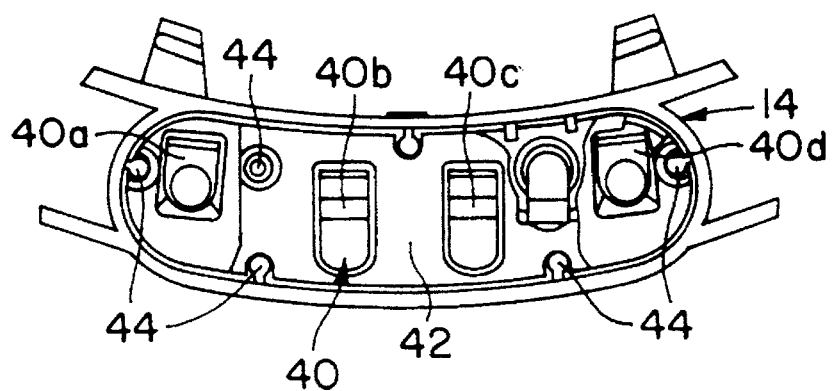
FIG. 8 is a transverse cross-sectional view of the casing along the line 8—8 of FIG. 1.

The second interconnection contact circuit 40 comprises contact strips 40a, 40b, 40c, 40d arranged on an insulating plate 42, which is inserted via the top of the casing 14 and positioned at the bottom by guiding and holding studs 44 cast with the casing 14 (FIG. 8). The power supply cable 46 of the receiver, for example a lighting lamp, comprises two conductors electrically connected to the contact strips 40a and 40d of the second contact circuit 40. The cable 46 passes tightly through an orifice 49 arranghed in the bottom of the casing 14.

The bottom edge 47 of the cover 16 is provided with a U-shaped groove 48 designed to cover the upper edge of the casing 14 when the case 10 is closed. An O-ring type seal 50 is housed at the bottom of the groove 48 to achieve tightness at the level of the assembly interface of the cover 16 and casing 14.

Figure 9:
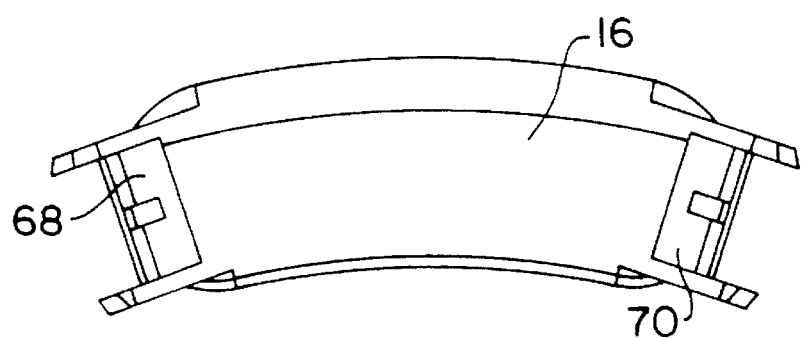
FIG. 9 shows a plan view of the cover.

On the two opposite narrow side faces 52, 54 of the casing 14, there are articulated two grips 56, 58 for clamping the cover 16 onto the casing 14. The two grips 56, 58 are identical, and both comprise a latching surface 60 located at the top end, a gripping edge 62 at the bottom end, and an intermediate articulation zone 64 on a rod 66, whose opposite end is mounted with limited rocking on a spindle securedly united to the corresponding side face 52, 54 of the casing 14. Two recesses 68, 70 (FIG. 9) are arranged at the opposite ends of the cover 16 to receive the latching surfaces 60 of the two grips 56, 58.

The casing 14 comprises in addition hooks 72 arranged on an external large side face 74 (FIG. 6) and designed to receive an attachment part, notably a flexible strip of a head-mounted lighting lamp.

The battery support 18 is equipped at the level of each compartment 20, 22, 24, 26 with a flexible tab 76 bearing on the cylindrical lateral surface of the battery 12 to urge the latter to an ejection position (see FIG. 2 at the level of the compartment 22) in the course of withdrawal of the support 18. The pressure of these tabs 76 makes the batteries 12 easy to grasp when replacing the latter.

The electrical distribution of the contact strips of the two circuits 34, 40 ensures serial connection of the batteries 12 in the normal insertion position in the compartments 20, 22, 24, 26 of the support 18.

The different stages of fitting the batteries 12 in the case 10 are illustrated in FIGS. 1 to 5:

In FIG. 1, total extraction of the module 19 with cover 16 and support 18 after the unlocking phase of the grips 56, 58 enables the batteries 12 to be fitted in the respective compartments 20, 22, 24, 26 of the support 18. The four batteries 12 extend parallel to one another in the longitudinal direction of insertion of the module 19 in the casing 14.

Figure 2:
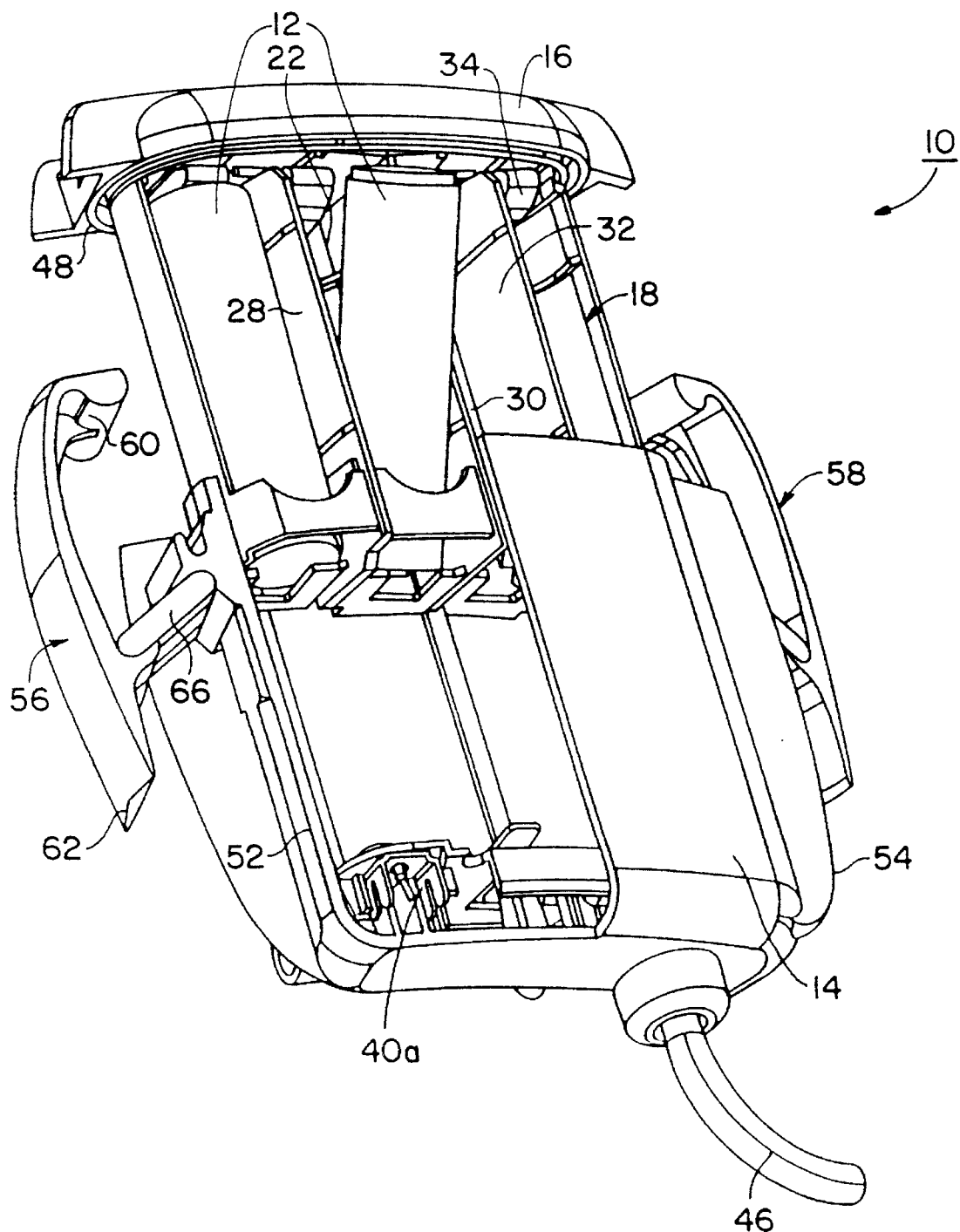
FIG. 2 shows an identical view to FIG. 1 at the beginning of the insertion travel of the module in the casing.
Figure 3:
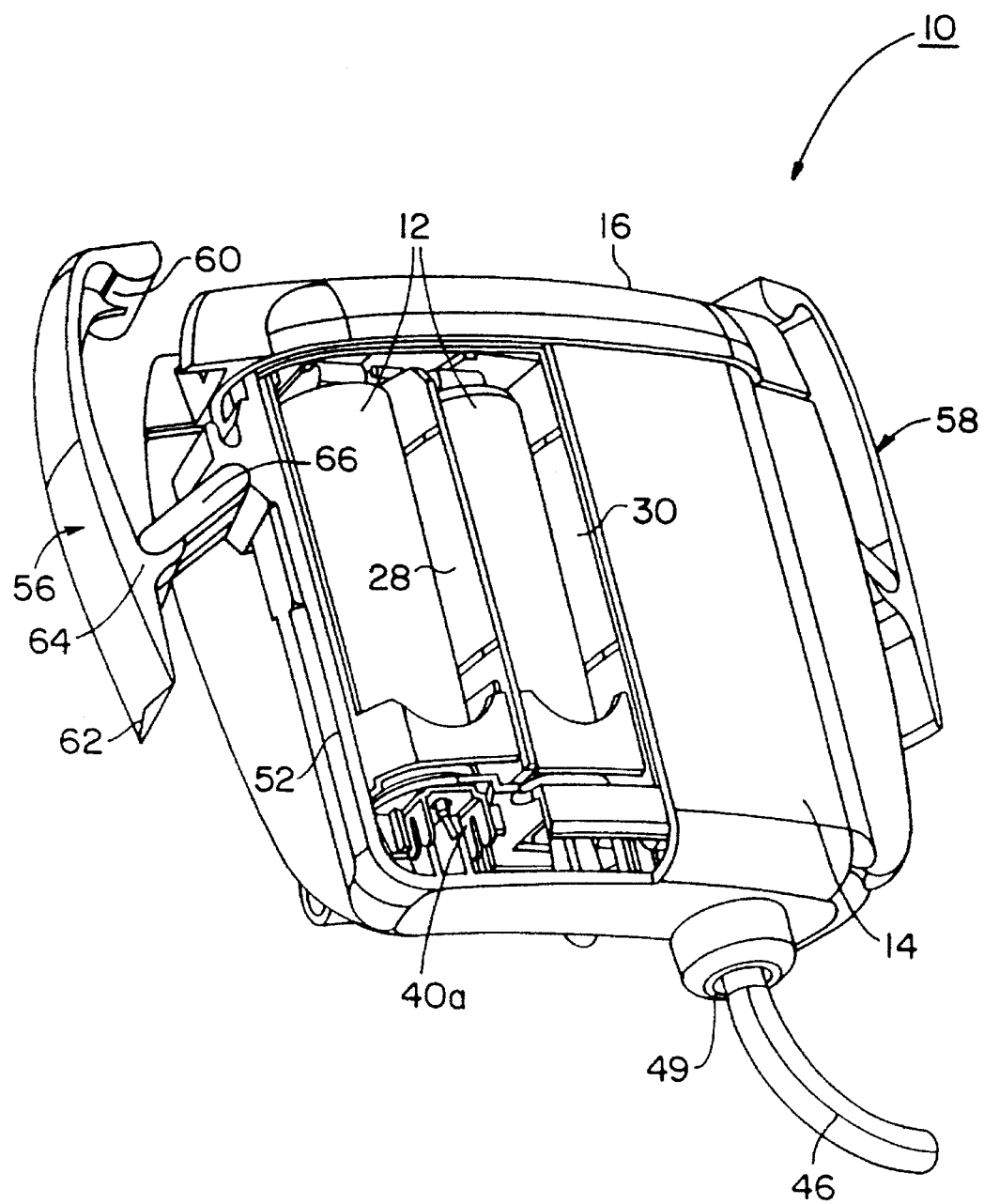
FIG. 3 is an identical view to FIG. 1 after the module has come up against the contacts arranged at the bottom of the casing, and the grips are in the inactive position.
Figure 4:
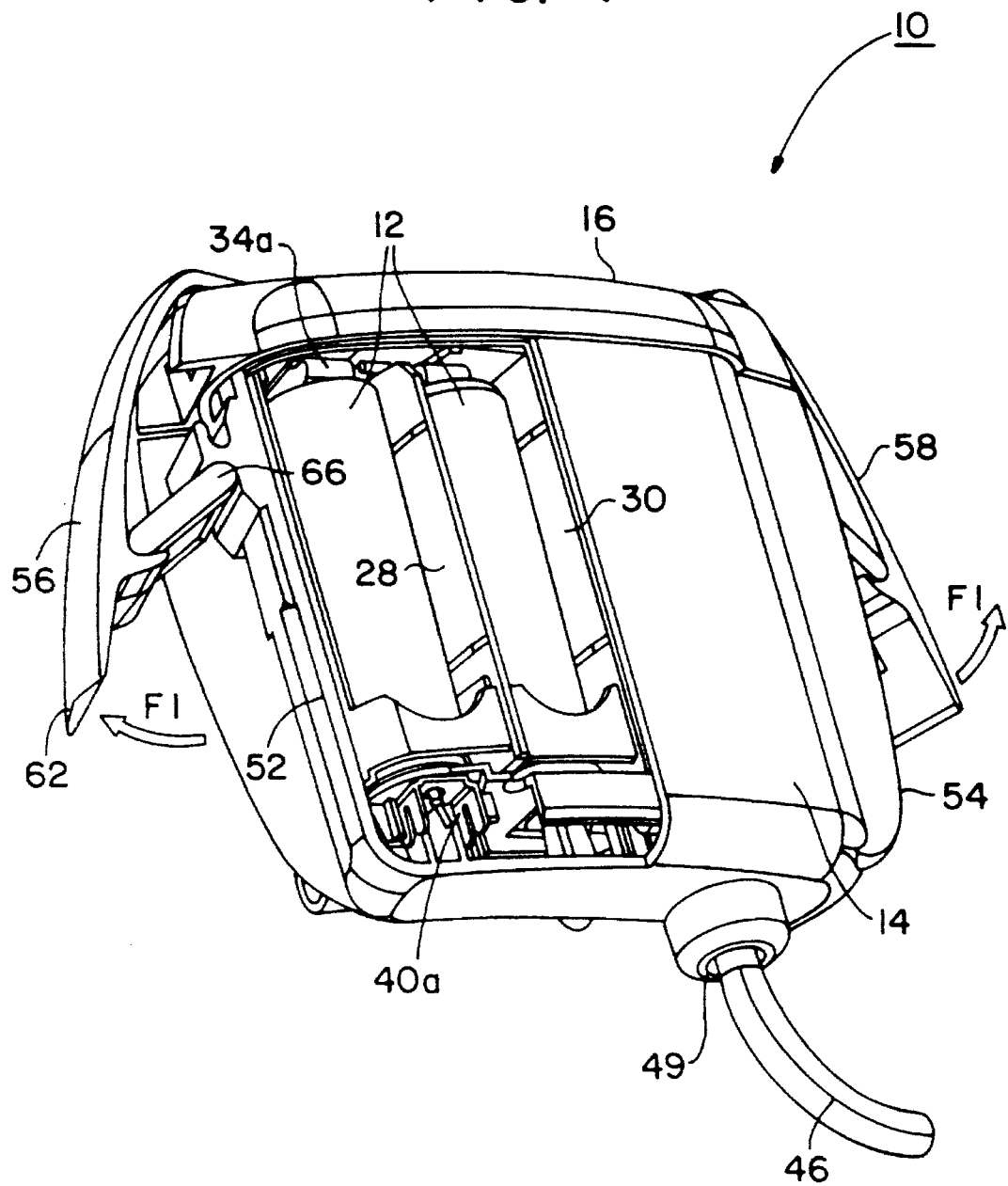
FIGS. 4 and 5 represent identical views to FIG. 1 respectively at the beginning and end of tightening of the grips for closing of the cover.

FIG. 2 shows the beginning of the insertion phase of the module 19 in the casing 14. The four bottom poles of the batteries 12 move progressively towards the second contact circuit 40 in the course of the downwards movement of the module 19. Insertion of the module 19 in the casing 14 is performed eiher by the natural effect of gravity in the vertical position of the casing 14 or by a pushing action on the cover 16 when the casing 14 is in a different position. The two grips 56, 58 remain inactive up to the end of insertion travel of the module 19 (FIG. 3), corresponding to coming into engagement of the batteries 12 with the contact strips 40a, 40b, 40c, 40d of the second interconnection circuit 40.

The grips 56, 58 then simply have to be pivoted outwards in the separation direction of the arrows F1 (FIG. 4) to achieve pre-assembly of the case 10. The latching surfaces 60 of the two grips 56, 58 are engaged in the respective recesses 68, 70 of the cover 16 and prevent any withdrawal movement of the module 19. The battery 12 of the first left-hand compartment 20 is then in contact with the contact strips 34a, 40a, that of the second compartment 22 with the contact strips 34b, 40b, that of the third compartment 24 with the contact strips 34c, 40c, and that of the fourth right-hand compartment 26 with the contact strips 34d, 40d.

Figure 5:
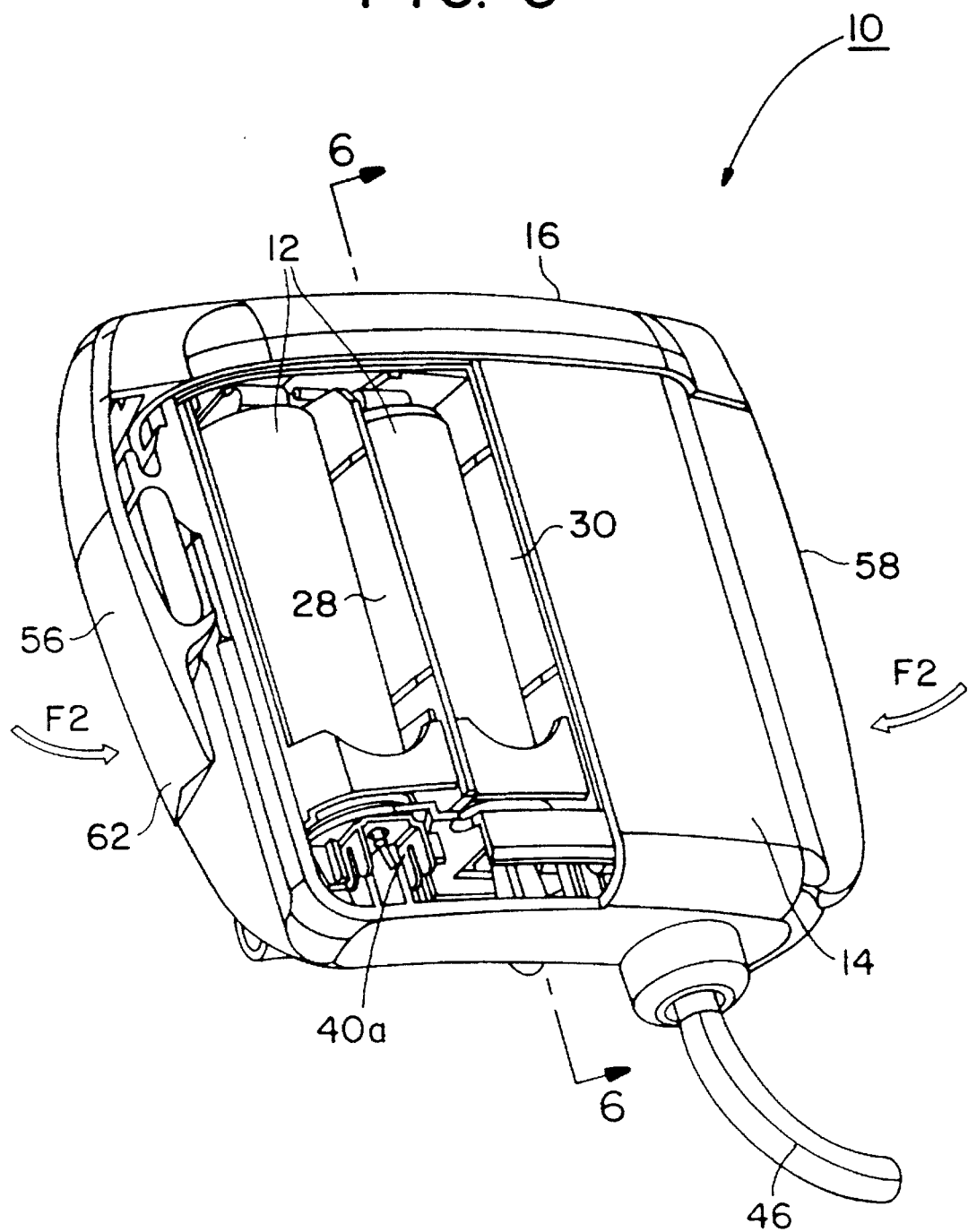

In FIG. 5, final tightening of the cover 16 on the casing 14 is derived from a rocking movement of the grips 56, 58 towards one another in the direction of the arrows F2, until the gripping edges 62 come up against the two narrow side faces 52, 54 of the casing 14. The symmetrical tightening forces of the two grips 56, 58 causes a continued downwards movement of the module 19 towards the bottom of the casing 14 to generate both a contact pressure distributed among the batteries 12 and the different contact strips of the circuits 34 and 40, and a perfect tightness at the level of the assembly interface of the cover 16 on the top edge of the casing 14. The overtravel of the module 19 during tightening of the grips 56, 58 corresonds appreciably to the compression of the contact strips 34a, 34b, 34c, 34d; 40a, 40b, 40c, 40d, each strip being curved in a U shape.

FIG. 6 shows the arrangement of a battery 12 in the compartment 20 in the sealed state of the case 10. The two contact strips 34a and 40a are compresed to the maximum to obtain a doubling of the contact pressure on the two opposite poles of the battery 12. The elastic action of the tab 76 on the lateral surface of the battery 12 positions the latter with a slight incline A with respect to the longitudinal axis 80 of the corresponding compartment 20.

Opening of the case 10 to replace the batteries 12 is carried out in the reverse sequence to that of assembly, performing the phases of FIGS. 5 to 1. After unlocking the grips 56, 58, and moving the latching surfaces 60 to the inactive position (FIG. 3), the module 19 can be removed from the casing 14 to enable access to the batteries 12. At the end of the withdrawal travel (FIG. 2), the batteries 12 come out of their respective compartments 20, 22, 24, 26 automatically due to the ejection action of the flexible tabs 76.

In FIG. 1, the module 19 is completely removed from the casing 14 for replacement of the batteries 12.

According to an alternative embodiment (not represented), a stop limiting the travel of the module 19 can be arranged on the casing 14 in such a way as to stop the module 19 in the position of FIG. 2. The module 19 is mounted captive, but nevertheless facilitates replacement of the batteries 12 in the end of withdrawal travel position.

It is clear that the batteries 12 can be replaced by accumulator cells, or any other voltage sources. In this embodiment (not represented), the support part can also be eliminated, after the different accumulator cells have been mechanically secured to one another to form a monoblock assembly fixed to the cover 16. The extractable module 19 is then formed by the cover 16 and the monoblock accumulator cell assembly. The contact strips 34a, 34b; 34c, 34d are eliminated, the electrical connection between the different accumulator cells being achieved by welding of connecting strips.

The case 10 is advantageously achieved by moulding of a plastic material.

I claim:

1. A case for housing voltaic cells, and comprising a hollow casing containing a means for supporting the voltaic cells, a cover sealing the casing, and an electrical interconnection circuit with a cable passing through an orifice of the casing for supply of an external receiver, said case comprising:

means for supporting the voltaic cells, and being secured to the cover to form a module in the form of an extractable cartridge, a first contact circuit connecting the voltaic cells to one another in the vicinity of the cover, a second contact circuit arranged facing the first circuit at the bottom of the casing, and means for securing the cover on the casing, and comprising a pair of grips, articulated symmetrically on the opposite side faces of the casing, each grip comprising a latching surface designed to cooperate with a retaining part located at each end of the cover so as to generate both a uniform contact pressure distribution over all the voltaic cells and a tightness at the level of the assembly interface of the cover and top edge of the casing.

2. The case according to claim 1, wherein the removable support means comprises adjacent compartments for positioning and securing the voltaic cells, the first contact circuit is supported by the internal surface of the upper wall of the support means and extends transversely between the compartments, and the external surface of said wall is equipped with clipping means designed to be clipped into conjugate orifices of the cover to form said module.

3. The case according to claim 1, wherein the bottom edge is provided with a U-shaped groove designed to cover the upper edge of the casing with interposition of a seal.

4. The case according to claim 1, wherein each grip is equipped with a gripping part located opposite the latching surface, and an intermediate articulation zone on a rod mounted with limited rocking on a spindle borne by the corresponding side face of the casing.

5. The case according to claim 2, wherein each compartment of the support means comprises a flexible tab coming up against the lateral surface of the voltaic cell, said tab being arranged to position the voltaic cell with a slight incline with respect to the longitudinal axis of the compartment so as to enhance ejection of the voltaic cell when the module is withdrawn.

6. The case according to claim 1, wherein the casing comprises a stop limiting the travel of the module to make the latter captive.

7. The case according to claim 1, wherein the second contact circuit comprises flexible contact strips arranged on an insulating plate positioned by guiding studs on the bottom of the casing.

8. The case according to claim 1, using electrical accumulator cells, wherein the accumulator cells are mechanically secured to one another to form a monoblock assembly fixed directly to the cover, electrical connection of the accumulator cells being achieved by welding of connecting strips.

* * * * *